(12) United States Patent
Scholl

(10) Patent No.: US 12,547,544 B1
(45) Date of Patent: Feb. 10, 2026

(54) CORE SNOOPING CACHE

(71) Applicant: SAP SE, Walldorf (DE)

(72) Inventor: Maxim Scholl, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/952,248

(22) Filed: Nov. 19, 2024

(51) Int. Cl.
*G06F 12/00* (2006.01)
*G06F 12/02* (2006.01)
*G06F 12/0817* (2016.01)
*G06F 12/0831* (2016.01)

(52) U.S. Cl.
CPC ...... *G06F 12/0831* (2013.01); *G06F 12/0246* (2013.01); *G06F 12/0822* (2013.01)

(58) Field of Classification Search
CPC ............. G06F 12/0831; G06F 12/0246; G06F 12/0822
USPC ........................................................ 711/118
See application file for complete search history.

(56) References Cited

U.S. PATENT DOCUMENTS

| | | | |
|---|---|---|---|
| 9,223,799 B1 * | 12/2015 | Veeraswamy | G06F 16/188 |
| 9,501,411 B2 * | 11/2016 | Guthrie | G06F 12/0811 |
| 2016/0110283 A1 * | 4/2016 | Iyigun | G06F 12/084 |
| | | | 711/130 |
| 2018/0165097 A1 * | 6/2018 | Hanley | G06F 12/14 |
| 2019/0121738 A1 * | 4/2019 | Ono | G06F 12/0831 |

* cited by examiner

*Primary Examiner* — Mardochee Chery
(74) *Attorney, Agent, or Firm* — SCHWEGMAN LUNDBERG & WOESSNER, P.A.

(57) ABSTRACT

Systems and methods described herein relate to a software cache that implements a processing core snooping mechanism. A reference to a data object is stored in a plurality of core pools of the software cache. Each core pool is uniquely associated with a respective processing core. The storing of the reference enables access to the reference from every core pool. A cache miss occurs with respect to a target reference when a first processing core does not find the target reference in a first core pool that is uniquely associated with the first processing core. In response to the cache miss, the target reference is retrieved from a second core pool that is uniquely associated with a second processing core. The second core pool is reachable from the first core pool. The target reference retrieved from the second core pool is copied to the first core pool.

20 Claims, 9 Drawing Sheets

CORE SNOOPING CACHE

TECHNICAL FIELD

The subject matter disclosed herein generally relates to software caches. More specifically, but not exclusively, the subject matter relates to a multi-core software cache that implements a processing core snooping mechanism.

BACKGROUND

Some computing systems utilize software caches with multiple pools, where each pool is linked to a respective processing core (e.g., linked to one physical Central Processing Unit (CPU) core or logical processing core). Each processing core thus essentially has its own portion of the cache. Such a configuration may be referred to as a "per-core pools" configuration.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
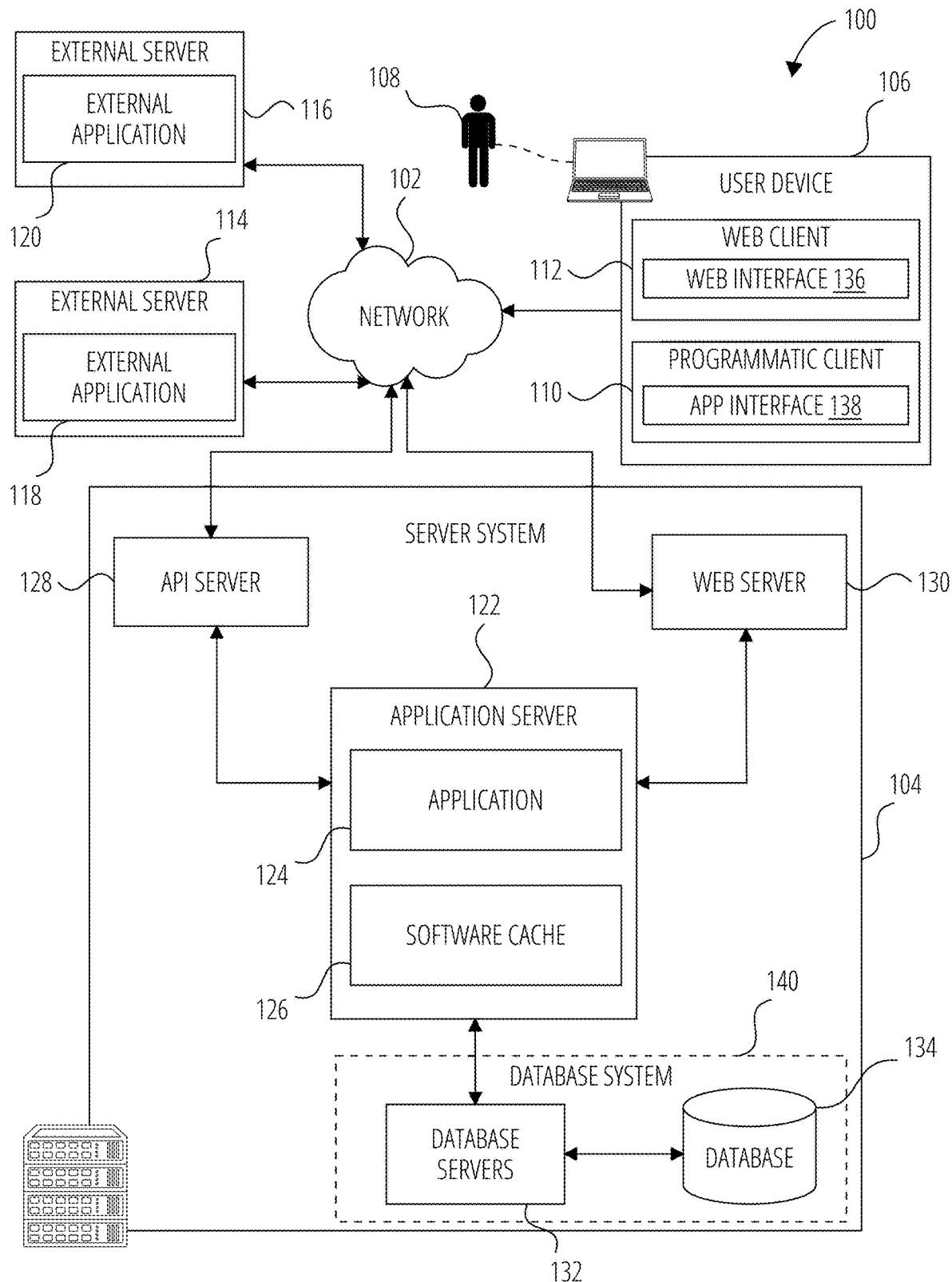
FIG. 1 is a diagrammatic representation of a network environment in which a software cache is implemented, according to some examples.

Typically, in a per-core pools configuration, each processing core can relatively freely access its own core pool without the need for complex locking mechanisms, thereby potentially reducing overall system latency. However, this configuration can drive up memory usage by duplicating cache entries per processing core. For example, during operation, when the current processing core of the software cache looks up data, it can only hit on entries that are available in the specific core pool associated with the current processing core. Significant duplication may thus exist between core pools to allow for effective functioning of the software cache. Moreover, since the current processing core is limited to utilizing its own core pool, cache misses frequently arise even when target entries are present in some of the other core pools.

Examples in the present disclosure provide a software cache that does not duplicate cached data for every processing core of a multi-core system and allows for the generation of cache hits even when data is not found on a current core pool. To reduce memory consumption, the software cache as described herein may store, in multiple core pools, only references to underlying data objects, and not the data objects themselves.

The present disclosure describes a snooping mechanism that is implemented in the context of a software cache. In some examples, when a processing core performs a load from cache, but does not find a reference to the relevant data in the current core pool (e.g., due to it being deleted by a purging process), the processing core performs a lookup in another core pool of the software cache that is reachable based on a pool access range of the current core pool (e.g., an "adjacent-core" lookup, as discussed further below). If the other core pool does contain the reference (e.g., because it has not been removed by a purging process), the current processing core creates a copy of the reference and stores it in its own core pool. In this way, the current processing core restores or establishes the reference for itself and successfully hits the relevant data where a strictly per-core pool system may have missed.

An example method is implemented by a computer system using a software cache that has a plurality of core pools. Each core pool is uniquely associated with a respective processing core of a plurality of processing cores. The processing cores may include physical and/or logical cores, for example, that are used in a database management system or database analytics system. In some examples, there is a one-to-one mapping between processing cores and core pools of the software cache.

The method may include creating a plurality of data objects. In this context, a "data object" refers to the actual data entry or data item (e.g., the underlying data item in memory), while a "reference" refers to a handle, pointer, or other reference to that data object that enables access to the data object from one or more core pools. In some examples, for each new data entry into the software cache, the system creates a single immutable data object in memory that contains the cached data, and then creates references, such as reference-counted handles (e.g., C++ shared pointers), that point to this single data object in a lightweight manner. In some examples, the references are distributed to different core pools, while the underlying data object (e.g., data resource that is actually of interest to the requesting entity) is created and stored only once.

In the context of the present disclosure, when a data object is created, a system may generate multiple handles or other reference instances that all point to that same underlying data object. While each core pool may contain its own unique handle or reference instance, all handles or reference instances for a given data object reference the same data object. Thus, when the present disclosure refers to "the reference" or "the target reference," it will be appreciated that this may include any handle or reference instance that points to the specific underlying data object of interest, even though the actual instances in core pools may be distinct. For example, a first core pool may include a first handle instance that points to a data object, while a second core pool includes a second handle instance that points to the same data object. In such a case, the first handle instance and the second handle instance are the same "reference" because they refer to the same underlying data object within the present context. As another example, the distributing of "a reference" to a subset of core pools may include generating multiple handle instances and inserting them across a subset of the core pools according to a predetermined distribution scheme, where each handle instance points to the same underlying data object but is stored in a different core pool.

Accordingly, in some examples, the system generates a reference to each respective data object. For each underlying data object, the reference is distributed to a subset of the core pools in a way that (at least initially) enables access to the reference from all of the core pools, including from core pools that do not themselves store the reference. The references in the core pools serve as references to the respective (actual or underlying) data objects that would be the real or ultimate targets of lookups or loading operations.

Data objects may vary significantly in size (e.g., from megabytes to gigabytes) and may represent various types of cached information such as database query results, intermediate calculation results, analytics data, or table data. On the other hand, the references used to point to the data objects are comparatively lightweight (e.g., a few bytes). In examples described herein, the respective data objects remain in a single location while multiple cores can access them through references, avoiding data duplication across cores. In other words, instead of sharing the actual data objects, which may be large in size, across multiple core pools, only the references thereto are shared across the core pools.

In some examples, the reachability of another core pool from a current core pool (e.g., from the core associated with the current core pool) is based on a pool access range. A "pool access range," as used herein, may include a range, set, pattern, sequence, or array of other core pools that a given processing core can access when a target reference is not present in its own core pool. The pool access range may be implementation-defined and can include, for example, adjacent pools (e.g., 2 pools on either side of the current pool), a percentage of total available pools, or randomized selection patterns.

The pool access range for a particular core pool can be determined relative to an identifier, location, position, or address of the particular core pool or its processing core. For example, a software cache can have 16 core pools and a pool access range that is defined by an adjacency range of 2. In such a case, core #8 may perform snoop lookups into the pools of cores #6, #7, #9, and #10, based on the defined pool access range.

However, in some examples, a pool access range is not strictly limited to directly adjacent or neighboring pools, as other patterns, ranges, or sets may also be configured. The pool access range can be fixed or variable, and can be predetermined (e.g., a fixed, preconfigured range) or set at runtime (e.g., dynamically determined based on memory consumption). Different processing cores may have different assigned ranges. The specific number of core pools included in a pool access range (e.g., 2 on either side of the current core pool, 3 on either side of the current core pool, or 4 on either side of the current core pool) can vary based on system characteristics (e.g., total number of cores used by the software cache), performance requirements, implementation-specific needs, system load, or data access patterns.

In some examples, a reference to a particular data object is distributed into core pools such that it is not necessarily inserted into every core pool but is "adjacency-reachable" from every core pool. The method may thus include distributing the reference to fewer than all of the plurality of core pools.

The method may further include implementing a predetermined reference distribution scheme that automatically varies the subset of the plurality of core pools in which a given reference is stored while enabling access to the given reference from each of the plurality of core pools based on the pool access range of the software cache. For example, the predetermined reference distribution scheme causes load balancing to be performed by varying a starting core pool in which the given reference is stored, and selecting other core pools relative to the starting core pool.

During operation, when a first processing core does not find a target reference in a first core pool (e.g., its own core pool), thus causing a cache miss (e.g., a local cache miss), the first processing core may retrieve the target reference (e.g., a handle to the same underlying data object) from a second core pool of a second processing core, based on the second core pool being within the pool access range of the first core pool. The first processing core then copies the target reference retrieved from the second core pool to the first core pool (e.g., by copying the handle or creating a new handle instance to the same underlying data object).

The software cache can be configured to implement a purging scheme to reduce memory consumption. Purging may include random reference removals performed on one or more of the core pools. Additionally, or alternatively, purging may include targeted reference removals, such as removal of a particular reference based on determining that the particular reference is present in fewer than a threshold portion of the plurality of core pools. The threshold portion may, for example, be set at a threshold value of between 15% and 45% of all pools.

A reference that is present in relatively few of the core pools (e.g., less than a lower threshold portion) can be referred to as a "cold entry" or "cold reference," while a reference that is present in relatively many of the core pools (e.g., more than an upper threshold portion) can be referred to as a "hot entry" or "hot reference."

In some examples, purging is triggered on a pool-specific basis. For example, a predetermined operation by the relevant processing core (e.g., a storing or overriding operation) triggers purges on the specific core pool of that processing core. In some examples, this may facilitate obtaining a configuration in which an underlying data object is only truly deleted if the relevant pool held the last reference to the data object (e.g., the last reference-counted handle). In other cases, removal operations are performed across multiple or all pools, such as when evicting all cold entries (e.g., entries present in less than one third of all pools) at the same time. In some examples, the system limits random erasures to a certain portion or percentage (e.g., 1%-10%) of a pool's capacity to maintain performance, rather than iterating through the entire pool.

In examples in the present disclosure, cold entries are more likely to be completely removed from the software cache than hot entries. Hot entries (those present in more pools) may naturally survive purging longer since they have multiple copies across pools, and further copies are created as additional processing cores perform successful snooping operations, while cold entries (present in fewer pools) are more likely to be removed since they have fewer copies.

Purging may also include removing references to data objects that are already marked for removal or expiry (e.g., underlying data in a table became invalid, expired, or a user deleted it from an underlying table). Such removals may be automatically performed prior to other types of removals, such as randomized removals or targeted removals of cold entries.

Examples in the present disclosure address the technical challenge of achieving low-latency cache usage, particularly for fetching of entries, while obtaining technical benefits from a memory usage perspective. With the core-snooping approach described herein, the software cache can hit data that was already pruned from a current processing core's pool but was not yet removed from the software cache completely. On high-throughput systems, for example, the described approach can facilitate the retention of frequently used data entries, while naturally pruning less frequently used data entries.

Conventional per-core cache systems have technical drawbacks, such as significantly increasing memory usage by duplicating cached data across multiple cores. For example, each core maintains its own complete copy of cached data, leading to excessive memory consumption that scales linearly with the number of cores. By storing only references as described herein, and reducing or limiting the number of pools in which they are retained, the software cache addresses or alleviates such technical drawbacks.

The purging approach in the present disclosure may perform well in multithreaded, high-frequency systems (e.g., with multiple users or customers). In some examples, software cache performs purging during store and/or override operations rather than during loads to maintain query performance. The purging mechanism may prune entries strategically based on usage patterns. The approach enables frequently accessed references to gradually accumulate in more pools through the snooping mechanism, improving hit rates for commonly used data, while ensuring that less frequently accessed references are removed.

Conventional per-core cache implementations typically look up data only in their own core's pool, limiting cache hit effectiveness. For example, when data is pruned from a core's local pool, that core completely loses access to the data even if it still exists in nearby pools. The subject matter in the present disclosure provides technical solutions that allow a processing core to successfully retrieve cached data even when the data has been pruned from its local pool, as long as the reference exists in an accessible pool, while not causing an excessive number of lookups in other pools (e.g., by selecting a modest pool access range or dynamically controlling the pool access range).

Examples in the present disclosure provide an efficient reference distribution scheme that automatically varies which subset of pools initially contains a given reference. For example, the distribution is load-balanced by varying the starting core pool and selecting other pools relative to that starting point. This technique may reduce contention by avoiding fixed or constant patterns that would cause certain pools to consistently hold the newest entries.

The subject matter described in the present disclosure provides concrete technical improvements to computing technology, specifically in the realm of multi-core software cache systems. For example, examples herein can significantly improve computer memory efficiency by reducing memory overhead associated with core pools, such as by reducing additional memory overhead to the size of data handles, as opposed to the size of the actual underlying data duplicated across pools. As another example, the snooping mechanism in the present disclosure can also improve computing technically by enabling a cache system to automatically search within a defined pool access range to retrieve and copy references from other core pools, allowing for successful cache hits even when data has been pruned from a local pool.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 112 (e.g., a browser) or a programmatic client 110 (e.g., an "app") may be hosted and executed on the user device 106.

An Application Program Interface (API) server 128 and a web server 130 provide respective programmatic and web interfaces to components of the server system 104. An application server 122 hosts an application 124 and a software cache 126, each of which may include components, modules, applications, or sub-applications.

The user device 106 can communicate with the application server 122, for instance, via the web interface supported by the web server 130 or via the programmatic interface provided by the API server 128. It will be appreciated that, although only one of the user device 106 is shown in FIG. 1, a plurality of user devices may be communicatively coupled to the server system 104 in some examples. Further, while certain functions may be described herein as being performed at either the user device 106 (e.g., web client 112 or programmatic client 110) or the server system 104, the location of certain functionality either within the user device 106 or the server system 104 may be a design choice.

The application server 122 is communicatively coupled to a database system 140. The database system 140 may include database servers 132, facilitating access to one or more information storage repositories, such as a database 134. In some examples, the database 134 includes storage devices that store information to be processed by the application 124 or the software cache 126.

The application server 122 accesses application data (e.g., application data stored by the database servers 132) to provide one or more applications or software tools. For example, the application 124 is provided to the user device 106 via a web interface 136 or an app interface 138, and the software cache 126 operates with the application 124 to improve performance.

The database system 140 may provide in-memory computing features, offering low-latency and high-speed data access. This can include rapid read and write operations, suitable for applications requiring real-time data access. Accordingly, at least part of the database system 140 can provide a database that stores data in memory instead of keeping it on disk. For example, a column-oriented in-memory database design can facilitate the running of advanced analytics alongside high-speed transactions. In-memory databases can be used for applications (e.g., the application 124) that benefit from speed and effective handling of spikes in traffic. The application 124 can, for instance, include features such as real-time analytics and predictive modeling, customer experience management, or logistics tools, accessible to the user 108 via the user device 106 (e.g., via the web interface 136).

In some examples, the database system 140 provides the application 124 with the ability to run searches (e.g., full-text and advanced fuzzy searches for numerous languages), and provides support for various data types and functions. In some examples, data items are stored and processed using graph structures. Various data structures can be utilized, such as text, predictive, spatial, document, or standard relational data structures. The database system 140 may be configured to store, query, and apply machine learning (ML) to streaming data to discover trends. Data sources may include sensors, plant equipment, or Internet of Things (IoT) devices.

The software cache 126 may provide a caching layer to improve performance by reducing database access, such as for frequently used or computationally expensive data. The software cache 126 may interface with the database system 140 (e.g., via the database servers 132) to connect to the database 134, allowing for efficient retrieval and storage of frequently accessed data. In some examples, the software cache 126 is preconfigured to maintain memory usage within defined limits, such as 10% to 30% of system memory, while supporting high-throughput, multithreaded access patterns.

In some examples, the application 124 and the software cache 126 operate on the server system 104 to provide a multi-tiered architecture for handling client requests and database operations. The software cache 126 may operate as a specialized memory management component within the application server 122, implementing a core snooping mechanism that efficiently manages cached data across multiple processing cores, as described in the present disclosure. In some examples, the software cache 126 maintains references to data objects while minimizing memory consumption by storing only lightweight handles in core-specific pools, rather than duplicating the underlying data for each processing core. The software cache 126 can also implement one or more specific purging mechanisms as described in the present disclosure.

In the context of the database system 140, the software cache 126 can improve performance by temporarily storing frequently accessed or computationally expensive data in memory, enabling faster retrieval or reducing the need for repeated computations or accessing of higher-level storage. This can include caching query results, execution plans, and metadata to improve response times for tasks. Additionally, intermediate results during query processing or commonly accessed data structures, such as indexes or dictionaries, may be cached to streamline operations. By effectively managing these cached resources with rules such as eviction policies and refresh mechanisms, the software cache 126 helps the server system 104 to enhance throughput, reduce latency, and deliver a more efficient user experience for data-intensive workloads (e.g., where the application 124 is used by a large number of users).

The software cache 126 may be a multi-pool cache. In some examples, the software cache 126 includes multiple core pools, each uniquely associated with a processing core. Furthermore, as described elsewhere herein, a processing core first looks for an entry in its own core pool, but may also perform snooping (e.g., within a specific range of other core pools) to attempt to locate the entry in another core pool (e.g., a core pool associated with another processing core).

The application server 122 may form part of a cloud-based platform provided by a software provider that allows the user 108 to utilize the tools of the application 124 and benefit from the software cache 126. For example, an account holder (e.g., the user 108) may access features on the application server 122 via one or more cloud instances.

One or more of the application server 122, the database servers 132, the API server 128, the web server 130, or parts thereof, may each be implemented in a computer system or multiple computer systems, in whole or in part, as described below with respect to FIG. 9. In some examples, external applications (which may be third-party applications or applications provided by the aforementioned software provider), such as an external application 118 executing on an external server 114 and external application 120 executing on an external server 116, can communicate with the application server 122 via the programmatic interface provided by the API server 128. For example, a third-party application may support one or more features or functions on a website or platform hosted by a third party, or may perform certain methodologies and provide input or output information to the application server 122 for further processing or publication.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
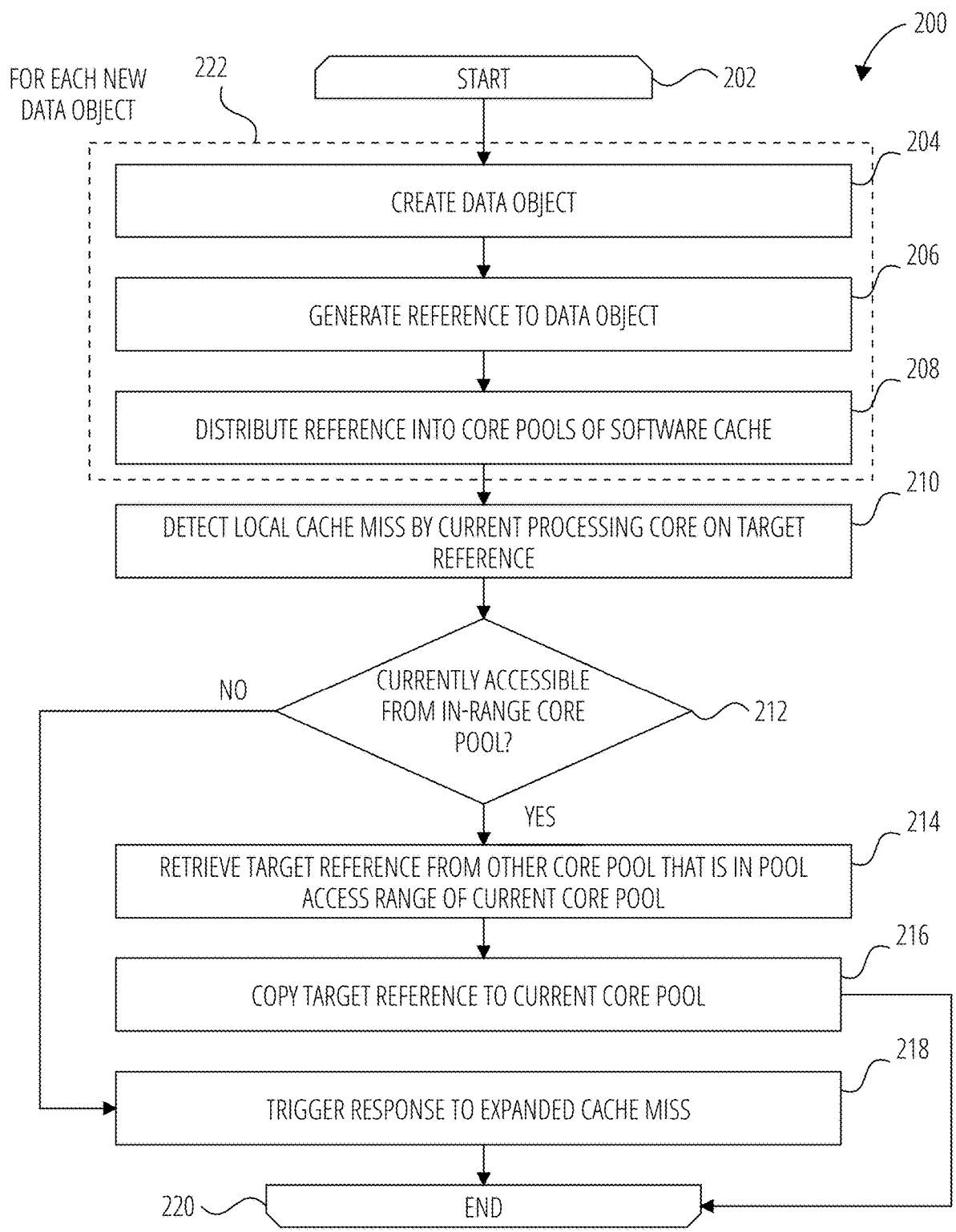
FIG. 2 is a flowchart illustrating operations of a method for implementing a software cache to store and access references to data objects, according to some examples.

FIG. 2 illustrates operations of a method 200 for implementing a software cache, according to some examples. Aspects of the method 200 may be performed by one or more components, devices, systems, networks, or databases shown in FIG. 1. Accordingly, and by way of example only, operations of the method 200 are described with reference to the software cache 126 of FIG. 1.

To perform the method 200 of FIG. 2, the software cache 126 operates using a multi-core system. Each processing core (e.g., each respective physical or logical core) is associated with a respective core pool of the software cache 126. For example, the software cache 126 might have 16 core pools served by 16 respective processing cores during operation.

The method 200 commences at opening loop element 202 and proceeds to operation 204, where the software cache 126 creates a new data object. In some examples, the software cache 126 generates an immutable data object to be cached to facilitate access thereto. The data object may be any suitable data structure or content to be cached for access (or possible access), such as database table data, query results, or analytics information. In some examples, the data object is created by the software cache 126 as a temporary value prior to a pool insertion process that distributes references to the data object, which is further described below.

At operation 206, the software cache 126 generates a reference to the data object. For example, the software cache 126 generates a lightweight handle (e.g., shared pointer) to the data object. In this regard, it will be appreciated that multiple instances may be generated, all referring or pointing to the same data object, and thus all being regarded as a "reference to the data object." At operation 208, the software cache 126 distributes the reference into core pools of the software cache 126. For example, the software cache 126 inserts respective handle instances into core pools. Upon initially creating and distributing the reference into core pools, the software cache 126 may distribute the reference to only a subset of the core pools—these can be referred to as the "initial pools"—but in such a manner that the reference is reachable from all core pools (e.g., not only from the initial pools themselves).

It will be appreciated that the software cache 126 can be configured to adhere to various rules as part of reference distribution, such as core pool memory limits. Operation 204, operation 206, and operation 208 may be performed for each new data object to be handled by the software cache 126, as indicated by the broken line 222 in FIG. 2.

In some examples, a data object is created by the server system 104 only once when first needed and is not duplicated across cores. Instead, lightweight references (e.g., reference-counted handles) pointing to the single underlying data object are distributed to core pools according to a predetermined reference distribution scheme. For example, as mentioned above, the data object is created as a temporary value prior to the pool insertion process, and is then inserted into the relevant pools via references (e.g., smart pointer copies) that take mutual ownership of the data object. In this way, the software cache 126 does not establish a "first-owning pool" that creates the data object, since the creation happens prior to and independently of pool insertion.

In some examples, such as where the software cache 126 employs reference-counted handles, a data object remains in memory until all references to it are removed from the core pools, at which point it is automatically destroyed by the software cache 126 to free up memory resources. For example, in a database analytics system, a data object might be table data that remains valid until invalidated by changes to the underlying database and accessible until pruned by a purging process, with multiple processing cores accessing the same data object through handles in their respective core pools.

At operation 210, the software cache 126 detects a cache miss by a current processing core on a target reference. For example, a request for data access reaches the software cache 126 from the application 124, triggering a lookup operation on the processing core that is handling the request. For example, if a worker thread is running on processing core #7 of a multi-core system (e.g., where 16 processing cores are used), processing core #7 first attempts to find the relevant reference to the data object associated with the request in its own core pool. The current processing core does not find the target reference in its own core pool. This type of cache miss may be referred to as a "local cache miss" in this context.

In response to the local cache miss, the current processing core performs a snooping operation, attempting to find the target reference in one or more of the other core pools. The specific core pools to be accessed by the current processing core are determined according to a pool access range associated with the current processing core. For example, the pool access range defines, for the current core pool of the current processing core, a number of adjacent core pools relative to the given core pool that can be accessed by the current processing core as part of the snooping operation.

For instance, and again using the example of processing core #7 (which is mapped to core pool #7), the pool access range might indicate that only two core pools on either side of the current core pool may be accessed for this purpose. Thus, processing core #7 can look for the target reference in core pools #5, #6, #8, and #9 if there is a miss with respect to core poll #7. Processing core #7 may then either locate the target reference in another core pool (in one, two, three, or four attempts if checking the other pools sequentially), or fail to locate the target reference where it is also absent from the other core pools in the pool access range. In examples of the method 200, the searching core is only permitted to snoop into the core pool/s within its pool access range.

Referring to decision operation 212 in FIG. 2, if the current processing core locates the target reference in one of the other core pools in its pool access range, the current processing core retrieves the target reference from that other core pool at operation 214, and copies the target reference to its own core pool at operation 216 (e.g., by creating a handle instance in its own core pool, pointing to the same underlying data object). It will be appreciated that when the relevant processing core does find the target reference, the target reference can be used to access the underlying data object.

On the other hand, and referring again to decision operation 212, if the current processing core does not locate the target reference in any of the other core pools it is configured to check according to the pool access range, there is no cache hit, and the software cache 126 triggers a conventional response to a cache miss at operation 218, such as triggering the accessing of higher-level memory in the database system 140. In the case where the current processing core fails to find the target reference in its own core pool and all the other core pools in the pool access range, this failure can be referred to as an "expanded cache miss." The method 200 concludes at closing loop element 220.

Thus, in some examples, the snooping operation allows the software cache 126 to check one or more additional core pools to locate and retrieve references that may have been pruned from a local pool of a particular processing core, or that have never been present in the local pool, but still exist elsewhere in the software cache. When a reference is found through snooping, the searching core may create a copy of the retrieved item in its own pool, thereby restoring or establishing local cache access. It is noted that, here, the searching core does not create a copy of the underlying data item, but rather of the reference to the data item, thereby keeping memory consumption modest.

The snooping mechanism enables frequently accessed entries to gradually accumulate in more pools over time, while allowing rarely accessed entries to be naturally pruned through purging. In some examples, the underlying data object (e.g., data resource that is actually of interest to the requesting entity) is destroyed and memory is freed up automatically once the last reference is removed from the core pools. This can be achieved, for example, by using a shared pointer that has built-in reference counting and automatically handles memory cleanup when the last reference to a data object is removed from all pools.

A reference-counted handle system thus allows the software cache 126 to automatically track when a data object is no longer needed (e.g., when the last handle is removed) and can be safely deleted from memory. Moreover, the shared pointer implementation may be technically beneficial in that thread synchronization can be effectively handled. Examples of purging techniques are described in more detail elsewhere in the present disclosure, such as with reference to FIG. 7.

Figure 3:
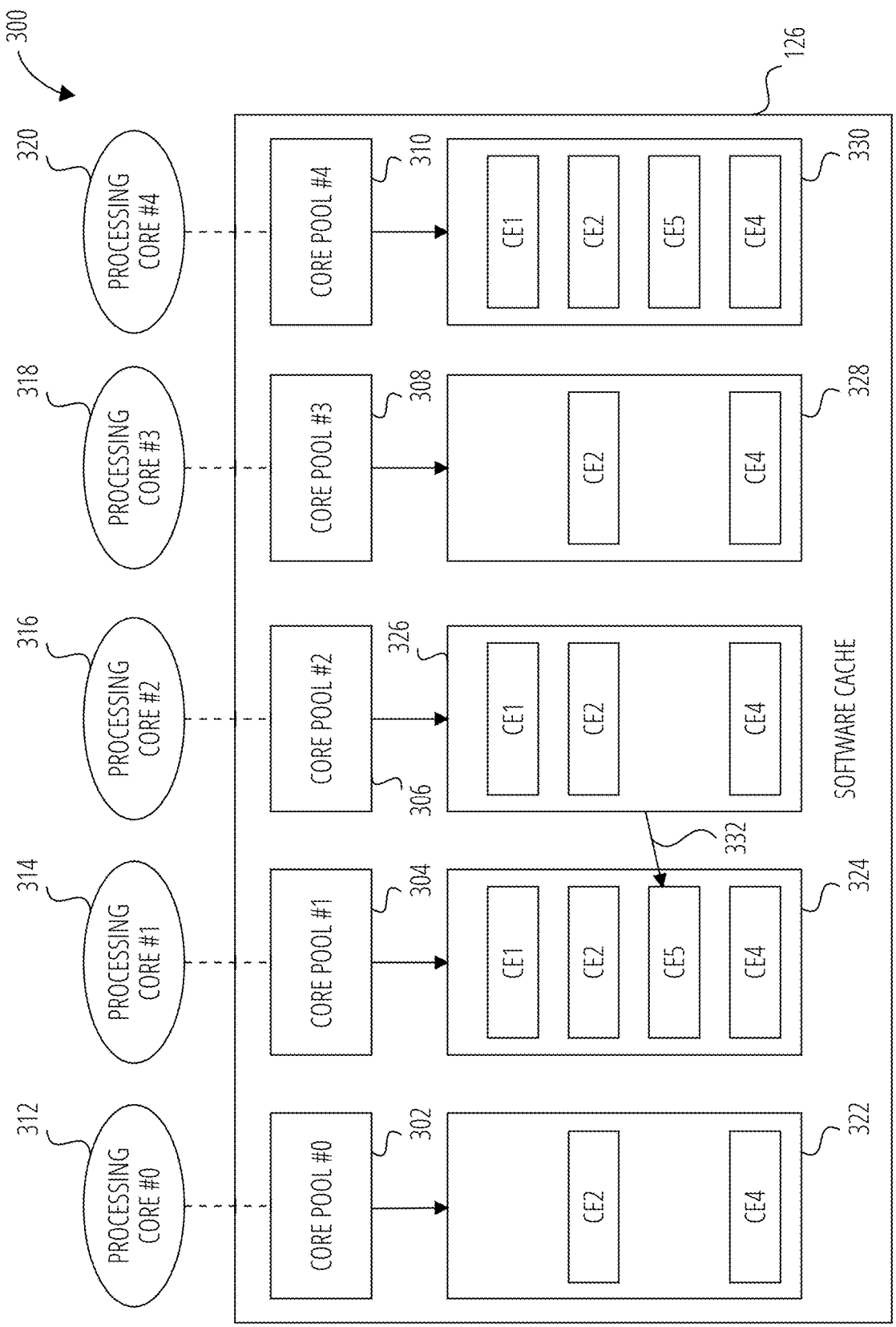
FIG. 3 is a diagrammatic illustration of a core pool configuration of a software cache, wherein an example lookup operation within the software cache is shown.
Figure 4:
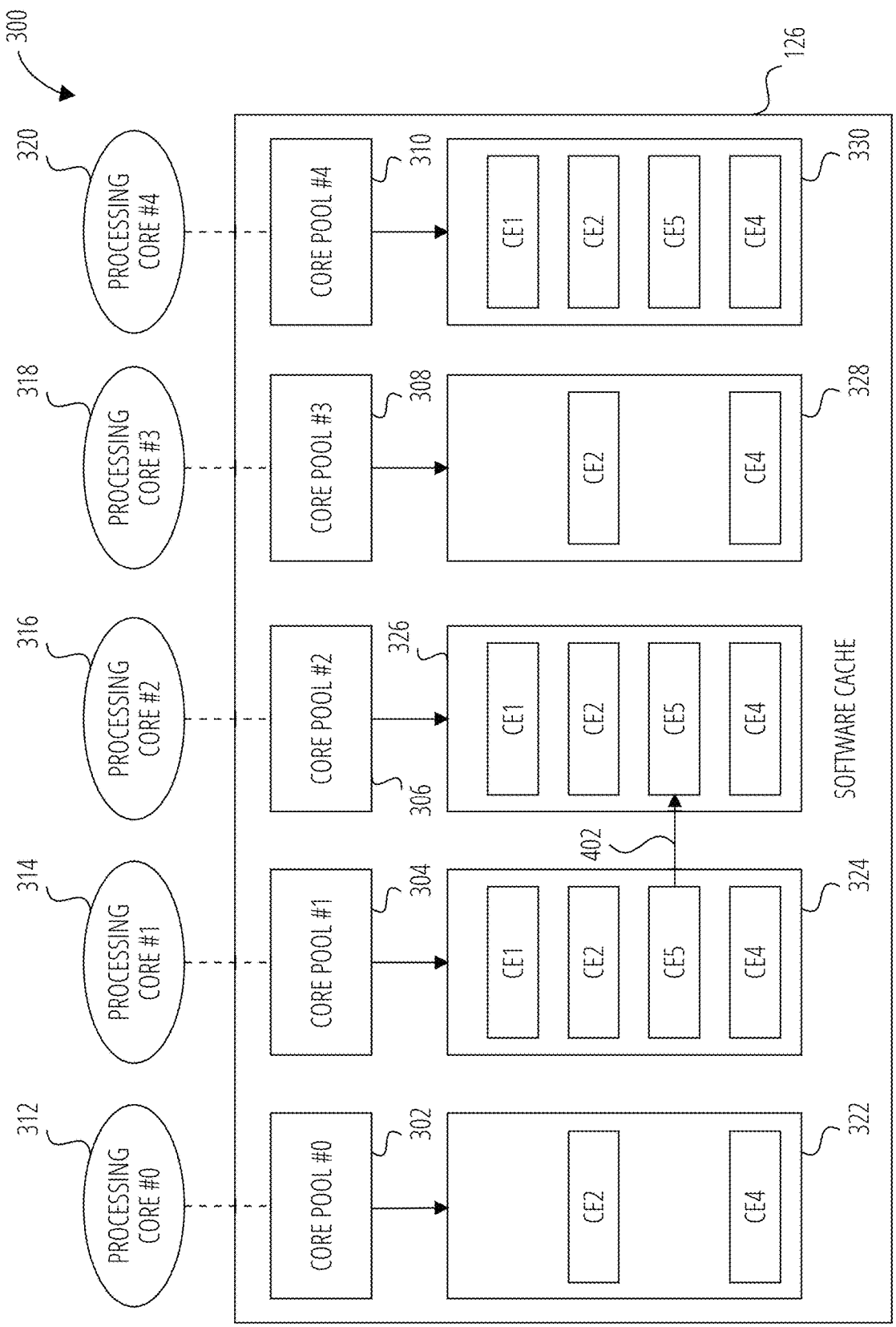
FIG. 4 is a diagrammatic illustration of the core pool configuration of FIG. 3, wherein an example copying operation within the software cache is shown.
Figure 5:
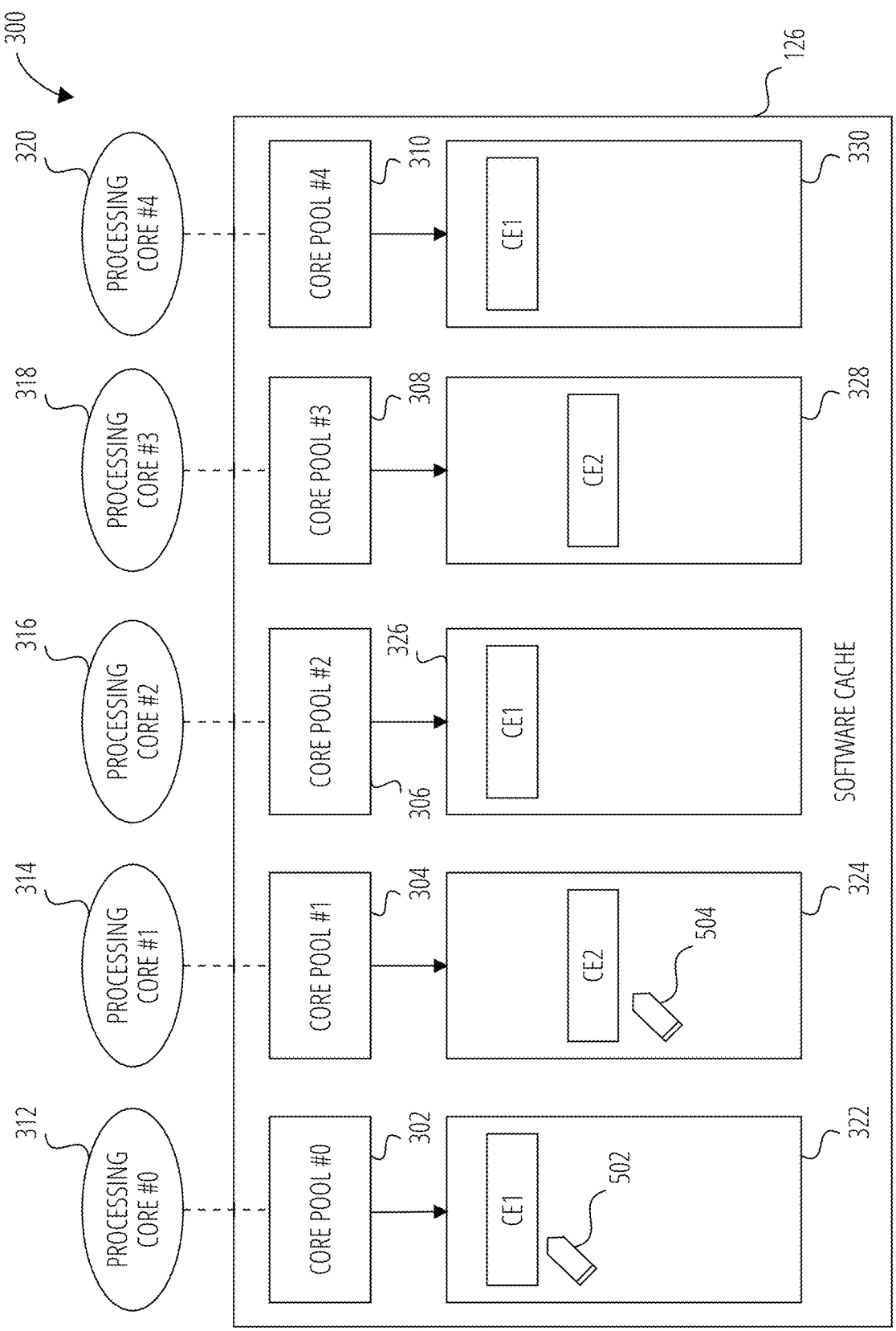
FIG. 5 is a diagrammatic illustration of the core pool configuration of FIG. 3, wherein aspects of a reference distribution scheme are shown.

FIG. 3, FIG. 4, and FIG. 5 illustrate aspects of a core pool configuration 300, according to some examples. The core pool configuration 300 may be implemented in the context of the networked computing environment 100 of FIG. 1. Accordingly, and by way of example only, the core pool configuration 300 is shown to include the software cache 126.

The core pool configuration 300 shows five core pools of the software cache 126: core pool 302, core pool 304, core pool 306, core pool 308, and a core pool 310, marked respectively as core pool #0, #1, #2, #3, and #4. Core pool 302 has pool entries 322, core pool 304 has pool entries 324, core pool 306 has pool entries 326, core pool 308 has pool entries 328, and core pool 310 has pool entries 330. Pool entries dynamically change during operation. Five core pools are shown in FIG. 3 merely to illustrate certain aspects of the present disclosure. It is noted that the software cache 126 may include less or more core pools (e.g., 8 core pools, 16 core pools, 30 core pools, or 50 core pools).

Each core pool of the software cache 126 is uniquely associated with a corresponding processing core. Thus, core pool 302 is associated with processing core 312, core pool 304 is associated with processing core 314, core pool 306 is associated with processing core 316, core pool 308 is associated with processing core 318, and core pool 310 is associated with processing core 320. The processing cores are marked respectively as processing core #0, #1, #2, #3, and #4 in FIG. 3. It will be appreciated that the software cache 126 would operate with less or more processing cores in examples in which it includes less or more core pools. For example, if the software cache 126 includes a total of 16 core pools, the software cache 126 includes 16 processing cores, which may be logical or physical cores, each uniquely associated with one of the core pools.

A core pool (e.g., the core pool 302) may be provided by a suitable data structure (e.g., an unordered container). For example, core pools may be implemented using hash maps to allow for efficient lookups. In some examples, each core pool operates independently for purging purposes while maintaining access to shared data through a pool access range mechanism. Core pools may contain varying numbers of references based on predetermined configurations, memory limits, or usage patterns, and the distribution of references across pools may be managed by the software cache 126 (e.g., through load balancing) to improve performance and memory usage.

A processing core (e.g., the processing core 312) may execute multiple threads concurrently and perform cache operations including lookups, insertions, and purging on its associated core pool. For example, in a system with 16 logical cores, each processing core may handle requests from multiple users while maintaining access to cached data through its associated pool and one or more other pools within a pool access range.

As shown in the core pool configuration 300 illustrated in FIG. 3, during operation of the software cache 126, references to cached data objects (e.g., CE1, CE2, CE4, and CE5) are distributed across the core pools. References may be implemented as reference-counted handles that track usage across multiple cores and automatically manage the lifecycle of the underlying data object. When the last reference to a data object is removed from all core pools, the underlying data object may be automatically destroyed and its memory freed. References can be distributed across pools according to various schemes and can be copied between pools when cache misses occur.

Each processing core has access to its associated core pool—for example, the processing core 312 accesses the core pool 302, and the processing core 320 accesses the core pool 310. Furthermore, each processing core can perform snoop lookups to attempt to retrieve references from certain other core pools. In some examples, when a processing encounters a cache miss in its own core pool, it can perform snoop lookups into adjacent pools within its defined pool access range.

To this end, FIG. 3 illustrates a lookup operation 332 in accordance with an example core snooping mechanism. In the case of FIG. 3, the pool access range is defined by an adjacency range of one. This means that the processing core 316 (processing core #2) can check not only its own core pool 306, but also one core pool on either side of the core pool 306.

When attempting to retrieve CE5, the processing core 316 first looks into its own core pool 306 (core pool #2). CE5 is not available in its own core pool 306. The processing core 316 then performs a lookup in the adjacent core pool 304, which is within its pool access range, to retrieve CE5. Furthermore, the processing core 316 then copies CE5 to its own core pool 306, as shown by the copying operation 402 in FIG. 4.

On the other hand, if CE5 had not been present in any of core pool 304, core pool 306, or core pool 308 (core pools #1, #2, and #3), but only in some other core pool such as core pool 310 (core pool #4), the snooping operation would have been unsuccessful since the core pool 310 is outside of the pool access range of the core pool 306.

Two further examples are discussed below:

Example 1: A software cache includes 16 core pools and applies an adjacency range of two. This means that, for example, core #8 will perform snoop lookups into the core pools of cores #6, #7, #9, and #10 (2 on either side of core #8). It is noted that a processing core ceases further snooping once it finds a target reference. For example, if core #8 immediately locates the target reference in the immediately adjacent core pool of core #7, no further lookup attempts are needed.

Example 2: The software cache includes 7 core pools with an adjacency range of three. This means that, for example, core #3 will perform snoop lookups into the core pools of core #0, #1, and #2 on one side thereof, and into the core pools of core #4, #5, and #6 on the other side thereof. Again, it is noted that a processing core ceases further snooping once it finds a target reference. For example, if core #3 locates the target reference in the core pool of core #1 after unsuccessfully checking the core pool of core #2, no further lookup attempts are needed on the core pools of the other cores (#0, #4, #5, and #6).

In some examples, in order to facilitate the initial reaching of a new reference (and thus a new data object in the software cache) from any core pool, the software cache 126 employs a predetermined reference distribution scheme during operation. In this context, a reference distribution scheme can include a method, rules, algorithm, or technique for distributing a reference (e.g., handles to a particular data object) across core pools. In some examples, the reference distribution scheme operates to target fewer than all pools (e.g., 50% of pools, 40% of pools, or 30% of pools) while ensuring each reference remains accessible from every pool through the relevant pool access range.

FIG. 5 shows aspects of such a reference distribution scheme, according to some examples. In the example of FIG. 5, the software cache 126 distributes references to a subset of the core pools, and also varies the starting pool into which each reference is stored.

As shown by arrow element 502 in FIG. 5, CE1 is stored in the core pool 302 (core pool #0) as a starting pool, and then an offset of two is applied to ensure that CE1 is initially within reach of all core pools given the adjacency range of one. For example, even though CE1 is not initially stored in core pool 308 (core pool #3), both core pool 306 (core pool #2) and core pool 310 (core pool #5) initially store CE1 and are within the pool access range of core pool 308.

Furthermore, as shown by arrow element 504 in FIG. 5, CE2 is stored in the core pool 304 (core pool #1) as a starting pool, and then the offset of two is applied to ensure that CE2 is initially within reach of all core pools given the adjacency range of one. For example, even though CE2 is not initially stored in core pool 306 (core pool #2), both core pool 304

(core pool #1) and core pool 308 (core pool #3) initially store CE2 and are within the pool access range of core pool 306.

By varying the starting pool and applying the relevant offset, sequence, or distributing patterns relative to the starting pool, the software cache 126 ensures that different references (which in this context refers to references to different data objects) are stored in different subsets of the overall set of core pools, as shown in FIG. 5. The varying of the specific subset of pools used as the initial pools for a given reference can facilitate load distribution in the software cache 126 and reduce technical issues such as contention. For example, when strictly targeting a fixed, predetermined range of pools as the initial pools for all new references, then the constantly used pools (e.g., core pool #0) will hold significantly more entries than other pools that are not in the initial set.

As a result of the snooping approach implemented by the software cache 126, in some examples, core pools that do not hold a new reference initially may find the new reference by snooping into one of the initial pools. Frequent access of entries will gradually and systematically place handle copies into additional core pools. In this way, the software cache 126 may reduce latency for hot entries.

To further illustrate reference distribution, the aforementioned example of a 16-pool system with an adjacency range of 2 can be considered. To ensure that a new entry can initially be hit by core #8, the entry should be stored in at least one of pools #6, #7, #8, #9, or #10. It is noted that, while a reference is initially reachable from any core pool, invalidation may still occur between the time of initial distribution and a processing core attempting a hit. For example, expiry-based invalidation or memory pressure invalidation, which may occur as part of normal operation of the software cache 126, may cause references to be removed from core pools of the software cache 126. Thus, in some examples, the reference distribution scheme attempts to ensure that a newly stored reference is initially reachable from all core pools.

Examples in the present disclosure enable the software cache 126 to maintain a balance between memory efficiency and lookup performance by employing "adjacency-reachable" data distribution (or distribution complying with another suitable pool access range) in combination with core snooping. In some examples, this balance is facilitated by (a) storing handles to data, reducing memory duplication, (b) distributing entries across pools in a way that ensures they can be found through adjacent lookups, (c) allowing cores to search other (e.g., neighboring) pools when a local lookup fails, increasing the chance of a cache hit without requiring data duplication in every pool, and (d) dynamically adjusting the presence of entries across pools based on usage patterns, effectively managing hot and cold entries.

Figure 6:
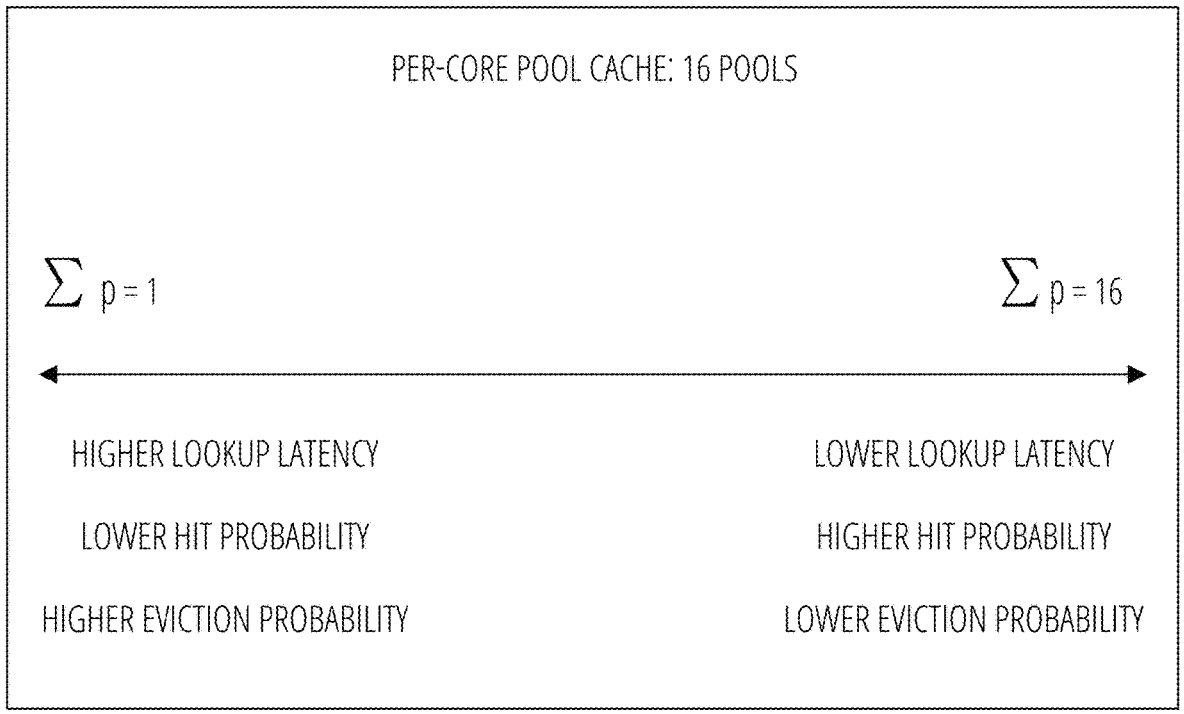
FIG. 6 conceptually illustrates a performance spectrum for a per-core pool cache implementation with 16 core pools, according to some examples.

FIG. 6 conceptually illustrates a performance spectrum for a per-core pool cache implementation with 16 core pools, according to some examples. Specifically, FIG. 6 demonstrates the relationship between the number of pools containing a reference (represented by Ep) and three performance characteristics of a software cache (e.g., the software cache 126 of FIG. 1).

The number or portion of pools set as initial pools may be implemented-defined. In some examples, a higher number of initial pools will reduce the latency of a first lookup of a new entry, as it will reduce the amount of required snoops to find the entry (which could even be reduced down to zero, if all pools are set as initial pools). A smaller number of initial pools allows the software cache to free up memory more quickly from entries that are rarely or never used (cold entries). However, a larger number of initial pools may delay freeing up memory, while offering good initial hit performance and a higher probability of entries being recovered during/after random pruning.

Thus, in summary, as the number or portion of initial pools reduces, the software cache may exhibit:
- Higher lookup latency, as more adjacent core snooping operations are used to locate references.
- Lower hit probability since references are sparsely distributed.
- Higher eviction probability, due to fewer copies of references existing across pools.

Further, as the number or portion of initial pools increases, the software cache may exhibit:
- Lower lookup latency, as references are more likely to be found in a local pool, obviating the triggering of snooping operations.
- Higher hit probability since references are widely distributed.
- Lower eviction probability, as more copies exist which keeps the underlying data object "alive."

Figure 7:
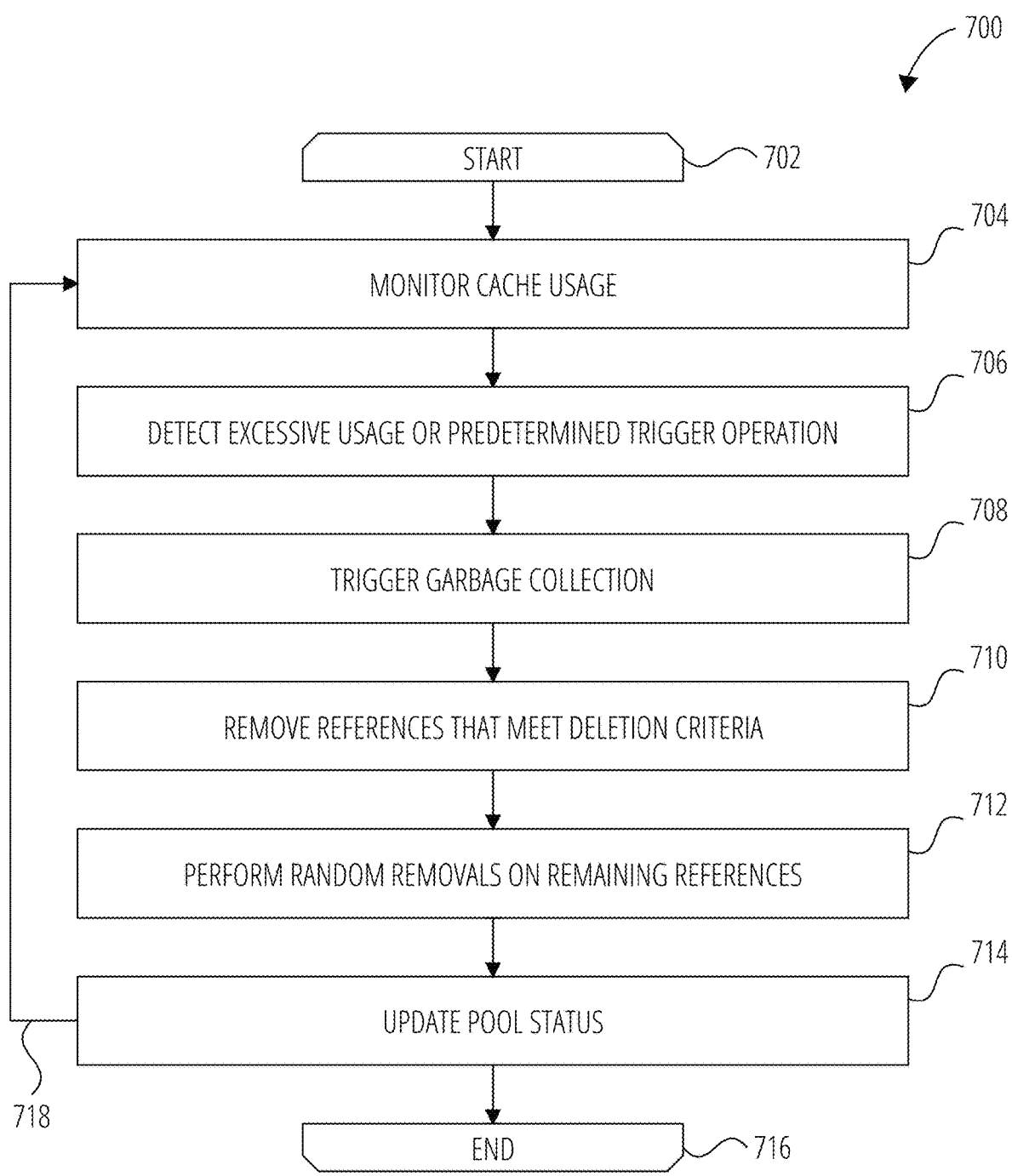
FIG. 7 is a flowchart illustrating operations of a method for removing references to data objects from a software cache, according to some examples.

FIG. 7 illustrates operations of a method 700 for removing references to data objects from a software cache, according to some examples. Aspects of the method 700 may be performed by one or more components, devices, systems, networks, or databases shown in FIG. 1. Accordingly, and by way of example only, operations of the method 700 are described with reference to the software cache 126 of FIG. 1.

The method 700 commences at opening loop element 702 and proceeds to operation 704, where the software cache 126 monitors cache usage across the core pools (e.g., a plurality of core pools such as those of FIG. 3) to track memory consumption and/or entry distribution. At operation 706, the software cache 126 detects excessive usage or a predetermined trigger operation, which triggers purging performed by the software cache 126 (operation 708).

A purge process can be triggered, for example, when the software cache 126 detects that a memory limit is exceeded at a particular point in time. For example, the memory limit for the overall cache system may be 10%, 20%, or 30% of total memory cost for the computing system in question. In some examples, memory or entry number limits can also be checked for pools themselves. However, in other cases, the pools as such do not have memory or entry number limits, and instead the software cache 126 checks overall memory usage or entry number limits (where relevant) for the cache as a whole.

Alternatively, or additionally, purging can be triggered by a predetermined operation. For example, when a processing core performs a storing operation or an overriding operation, the software cache 126 triggers purging. In some examples, purging is not triggered for loading operations so as not to slow down performance of query executions.

In some examples, purging is triggered and performed on a per-core basis. For example, when a particular processing core (e.g., the processing core 312 of FIG. 3) performs a specific operation such as one of the predetermined operations mentioned above, the software cache 126 triggers purging on that core. In other examples, purging is triggered and performance across multiple cores, as described further below.

Once purging has been triggered, the method 700 proceeds to operation 710 where the software cache 126 removes one or more references that meet deletion criteria. For example, invalidated references or references marked for expiry (e.g., based on underlying database changes) can be automatically removed from the software cache 126. As another example, the software cache 126 can prune cold entries, such as entries that are present in less than a threshold portion of all core pools (e.g., less than one-third of available core pools). When pruning cold entries, the software cache 126 may apply pruning across all core pools, instead of only pruning the current core pool. In other words, the method 700 may include a removing particular reference from all core pools currently storing the particular reference (e.g., removing all handles to a particular data object across all pools).

In some examples, and as shown at operation 712 of FIG. 7, the software cache 126 performs random reference removal on remaining references. The random reference removal may be performed on a per-core basis. For example, in response to detecting the predetermined operation performed by a current processing core, the software cache 126 randomly removes references only from the current core pool of the current processing core. The number of entries removed in this manner may be limited to a percentage of the pool's entries (e.g., a relatively small percentage, such as 2%, 5%, or 7%, or 10%).

Random removals can be effected by the software cache 126 using a predefined removal algorithm or schema. For example, the software cache 126 iterates across a pool using randomized jumps until a predefined percentage of the pool's entries have been covered. In some examples, each random removal is itself random in the sense that the specific offset and/or jumps are different (or at least randomized), thereby ensuring that the software cache 126 does not target the same addresses each time. For example, in a first operation, the software cache 126 targets the second, seventh, fourteenth, and nineteenth entries in the pool, while a second operation, the software cache 126 targets the third, sixth, eleventh, and fifteenth entries in the pool, ensuring that the software cache 126 does not hit the same address or element with the same jumps every time. Different erasure strategies may be defined at an implementation level and alternated by the implementation (depending on criteria or randomly). For example, some strategies include the aforementioned jumps, or erasing a linear sequence from a pool starting at a computed location (e.g., beginning, N from end, or arbitrary N position). Some strategies may be more effective when a pool fulfills certain criteria. For example, a strategy to erase only "invalid" data (not allowed to generate hits) can only be effective if that pool contains any invalid data in the first place. Such information can help make better strategy decisions at runtime, but specific strategies and determination may remain implementation-defined.

By default, during operation of the software cache 126 and as a result of a snooping mechanism as described herein, some entries (hot entries) exist in more of the core pools than others (cold entries). Since they are present in more pools, hot entries generally have a higher likelihood of remaining in the software cache 126 after randomized purging operations. In other words, random erases are less likely to evict all hot entries than they are to evict all cold entries. By combining this approach with the snooping mechanism described in the present disclosure, the software cache 126 can ensure that hot entries spread across the core pools while cold entries are more likely to be fully removed, freeing up memory (particularly the memory consumed by the underlying data objects associated with the cold entries).

It is noted that while the method 700 is shown to include both operation 710 and operation 712, other examples may include only one of operation 710 (deleting specific references according to deletion criteria) or operation 712 (deleting random references). The specific scheme can be implemented-defined. Without limitation, one particular example may include:

In a first stage, the software cache 126 checks for any cold reference that is present in fewer than one third of all available core pools, and immediately evicts that reference from all the core pools in which it is present.

Then, in a second stage, the software cache 126 attempts random erases (on the current core pool only) to (potentially) free up further memory.

The method 700 proceeds to operation 714, where the software cache 126 updates a pool status of the current core pool to reflect the changes made during purging (or updates the status of multiple pools where removals occurred across pools). As part of operation 714, the software cache 126 may track or check which references remain in which pools (e.g., to allow for future detection of entries that have become "cold" by falling below a threshold presence across all pools).

Removal techniques described herein, such as the techniques described with reference to FIG. 7, may be particularly effective in a heavily multithreaded approach, such as in high-scale, high-frequency computing systems. One software cache instance with core snooping capabilities can simultaneously serve a large number of users in this manner.

As indicated by the return arrow 718 from operation 714 back to operation 704, the software cache 126 can continue to monitor cache usage and check for purge triggers during operation. The method 700 concludes at closing loop element 716.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a computer-implemented method performed by a computer system comprising memory and at least one hardware processor, the computer-implemented method comprising: for each data object of a plurality of data objects, storing a reference to the data object in a subset of a plurality of core pools of a software cache, each core pool of the plurality of core pools being uniquely associated with a respective processing core of a plurality of processing cores, and the storing of the reference enabling access to the reference from each of the plurality of core pools based on a pool access range; detecting a cache miss on a target reference by a first processing core of the plurality of processing cores that is uniquely associated with a first core pool of the plurality of core pools, the target reference being the reference to a particular one of the plurality of data objects; in response to detecting the cache miss, retrieving the target reference from a second core pool of the plurality of core pools that is uniquely associated with a second processing core of the plurality of processing cores, the second core pool being within the pool access range of the first core pool; and copying the target reference retrieved from the second core pool to the first core pool.

In Example 2, the subject matter of Example 1 includes, wherein the storing of the reference comprises distributing the reference to fewer than all of the plurality of core pools, the distributing of the references being performed for the plurality of data objects based on a predetermined reference distribution scheme that automatically varies the subset of the plurality of core pools in which a given reference is stored while enabling access to the given reference from each of the plurality of core pools based on the pool access range.

In Example 3, the subject matter of Example 2 includes, wherein the predetermined reference distribution scheme comprises varying a starting core pool selected from among the plurality of core pools in which the given reference is stored, and selecting one or more other core pools from among the plurality of core pools relative to the starting core pool.

In Example 4, the subject matter of any of Examples 1-3 includes, wherein the pool access range defines, for a given core pool of the plurality of core pools, a number of adjacent core pools relative to the given core pool that can be accessed by a given processing core that is uniquely associated with the given core pool.

In Example 5, the subject matter of any of Examples 1-4 includes, for each data object of the plurality of data objects: generating the data object as an immutable data object; storing the immutable data object in memory; and generating the reference that is stored in the subset of the plurality of core pools to enable access to the immutable data object via the software cache.

In Example 6, the subject matter of any of Examples 1-5 includes, performing random reference removals on one or more of the plurality of core pools.

In Example 7, the subject matter of Example 6 includes, wherein the random reference removals are performed on a current core pool of the plurality of core pools in response to detecting a predetermined operation of a current processing core of the plurality of processing cores.

In Example 8, the subject matter of any of Examples 1-7 includes, determining that a particular reference is present in fewer than a threshold portion of the plurality of core pools; and removing the particular reference from one or more of the plurality of core pools storing the particular reference based on determining that the particular reference is present in fewer than the threshold portion of the plurality of core pools.

In Example 9, the subject matter of Example 8 includes, in a first stage, targeting the particular reference for removal from a current core pool of the plurality of core pools; and in a second stage following the first stage, performing random reference removals on the current core pool.

In Example 10, the subject matter of any of Examples 8-9 includes, wherein the removing of the particular reference is performed on a current core pool of the plurality of core pools in response to detecting a predetermined operation of a current processing core of the plurality of processing cores.

In Example 11, the subject matter of any of Examples 8-10 includes, wherein the threshold portion is between 10% and 50%, or between 15% and 40%, or between 20% and 35%, of the plurality of core pools.

In Example 12, the subject matter of any of Examples 1-11 includes, wherein, for each data object of the plurality of data objects, the reference to the data object comprises a reference-counted handle.

In Example 13, the subject matter of any of Examples 1-12 includes, detecting that the target reference is no longer stored in any of the plurality of core pools; and in response to detecting that the target reference is no longer stored in any of the plurality of core pools, removing the data object to which the target reference refers from memory.

In Example 14, the subject matter of any of Examples 1-13 includes, wherein the retrieving of the target reference from the second core pool and the copying of the target reference from the second core pool to the first core pool are performed by the first processing core.

Example 15 is a system comprising: at least one memory that stores instructions; and one or more processors configured by the instructions to perform operations comprising: for each data object of a plurality of data objects, storing a reference to the data object in a subset of a plurality of core pools of a software cache, each core pool of the plurality of core pools being uniquely associated with a respective processing core of a plurality of processing cores, and the storing of the reference enabling access to the reference from each of the plurality of core pools based on a pool access range; detecting a cache miss on a target reference by a first processing core of the plurality of processing cores that is uniquely associated with a first core pool of the plurality of core pools, the target reference being the reference to a particular one of the plurality of data objects; in response to detecting the cache miss, retrieving the target reference from a second core pool of the plurality of core pools that is uniquely associated with a second processing core of the plurality of processing cores, the second core pool being with in the pool access range of the first core pool; and copying the target reference retrieved from the second core pool to the first core pool.

In Example 16, the subject matter of Example 15 includes, wherein the storing of the reference comprises distributing the reference to fewer than all of the plurality of core pools, the distributing of the references being performed for the plurality of data objects based on a predetermined reference distribution scheme that automatically varies the subset of the plurality of core pools in which a given reference is stored while enabling access to the given reference from each of the plurality of core pools based on the pool access range.

In Example 17, the subject matter of any of Examples 15-16 includes, wherein the pool access range defines, for a given core pool of the plurality of core pools, a number of adjacent core pools relative to the given core pool that can be accessed by a given processing core that is uniquely associated with the given core pool.

Example 18 is one or more non-transitory computer-readable media storing computer-executable instructions that, when executed by a computer system, cause the computer system to perform operations comprising: for each data object of a plurality of data objects, storing a reference to the data object in a subset of a plurality of core pools of a software cache, each core pool of the plurality of core pools being uniquely associated with a respective processing core of a plurality of processing cores, and the storing of the reference enabling access to the reference from each of the plurality of core pools based on a pool access range; detecting a cache miss on a target reference by a first processing core of the plurality of processing cores that is uniquely associated with a first core pool of the plurality of core pools, the target reference being the reference to a particular one of the plurality of data objects; in response to detecting the cache miss, retrieving the target reference from a second core pool of the plurality of core pools that is uniquely associated with a second processing core of the plurality of processing cores, the second core pool being within the pool access range of the first core pool; and copying the target reference retrieved from the second core pool to the first core pool.

In Example 19, the subject matter of Example 18 includes, wherein the storing of the reference comprises distributing the reference to fewer than all of the plurality of core pools, the distributing of the references being performed for the plurality of data objects based on a predetermined reference distribution scheme that automatically varies the subset of the plurality of core pools in which a given reference is stored while enabling access to the given reference from each of the plurality of core pools based on the pool access range.

In Example 20, the subject matter of any of Examples 18-19 includes, wherein the pool access range defines, for a given core pool of the plurality of core pools, a number of adjacent core pools relative to the given core pool that can be accessed by a given processing core that is uniquely associated with the given core pool.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
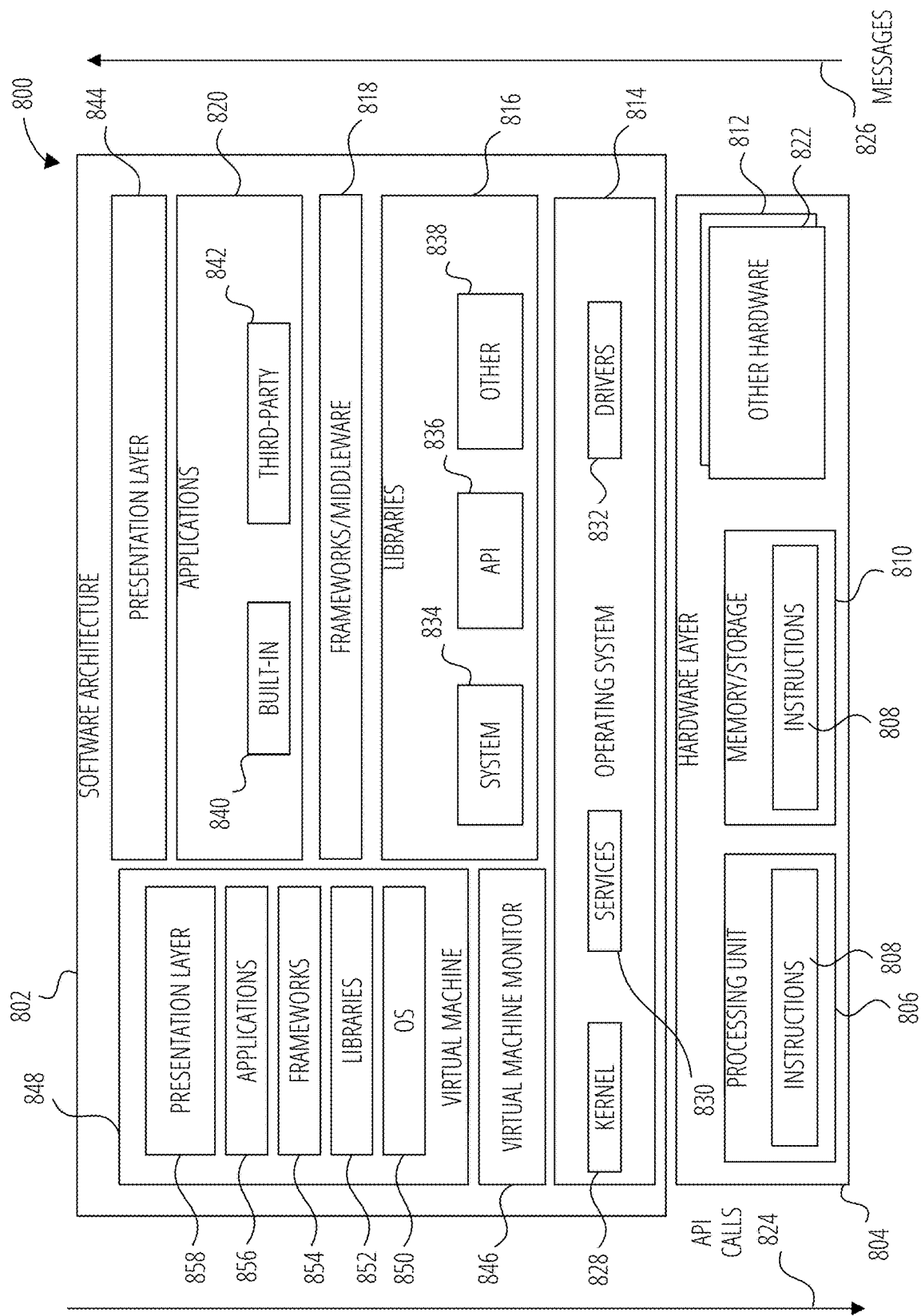
FIG. 8 is a block diagram showing a software architecture for a computing device, according to some examples.

FIG. 8 is a block diagram 800 showing a software architecture 802 for a computing device, according to some examples. The software architecture 802 may be used in conjunction with various hardware architectures, for example, as described herein. FIG. 8 is merely a non-limiting illustration of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 and other hardware 822 which represent any other hardware of the hardware layer 804, such as the other hardware illustrated as part of the software architecture 802.

In the architecture of FIG. 8, the software architecture 802 may be conceptualized as a stack of layers where each layer provides particular functionality. For example, the software architecture 802 may include layers such as an operating system 814, libraries 816, frameworks/middleware layer 818, applications 820, and presentation layer 844. Operationally, the applications 820 or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 or other components or layers. The libraries 816 typically provide functionality that allows other software modules to perform tasks in an easier fashion than to interface directly with the underlying operating system 814 functionality (e.g., kernel 828, services 830 or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware layer 818 may provide a higher-level common infrastructure that may be utilized by the applications 820 or other software components/modules. For example, the frameworks/middleware layer 818 may provide various graphic user interface (GUI) functions, high-level resource management, high-level location services, and so forth. The frameworks/middleware layer 818 may provide a broad spectrum of other APIs that may be utilized by the applications 820 or other software components/modules, some of which may be specific to a particular operating system or platform.

The applications 820 include built-in applications 840 or third-party applications 842. Examples of representative built-in applications 840 may include, but are not limited to, a contacts application, a browser application, a book reader application, a location application, a media application, a messaging application, or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 or drivers 832), libraries (e.g., system libraries 834, API libraries 836, and other libraries 838), and frameworks/middleware layer 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (e.g., operating system 814). A software architecture executes within the virtual machine 848 such as an operating system 850, libraries 852, frameworks/middleware 854, applications 856 or presentation layer 858. These layers of software architecture executing within the virtual machine 848 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Figure 9:
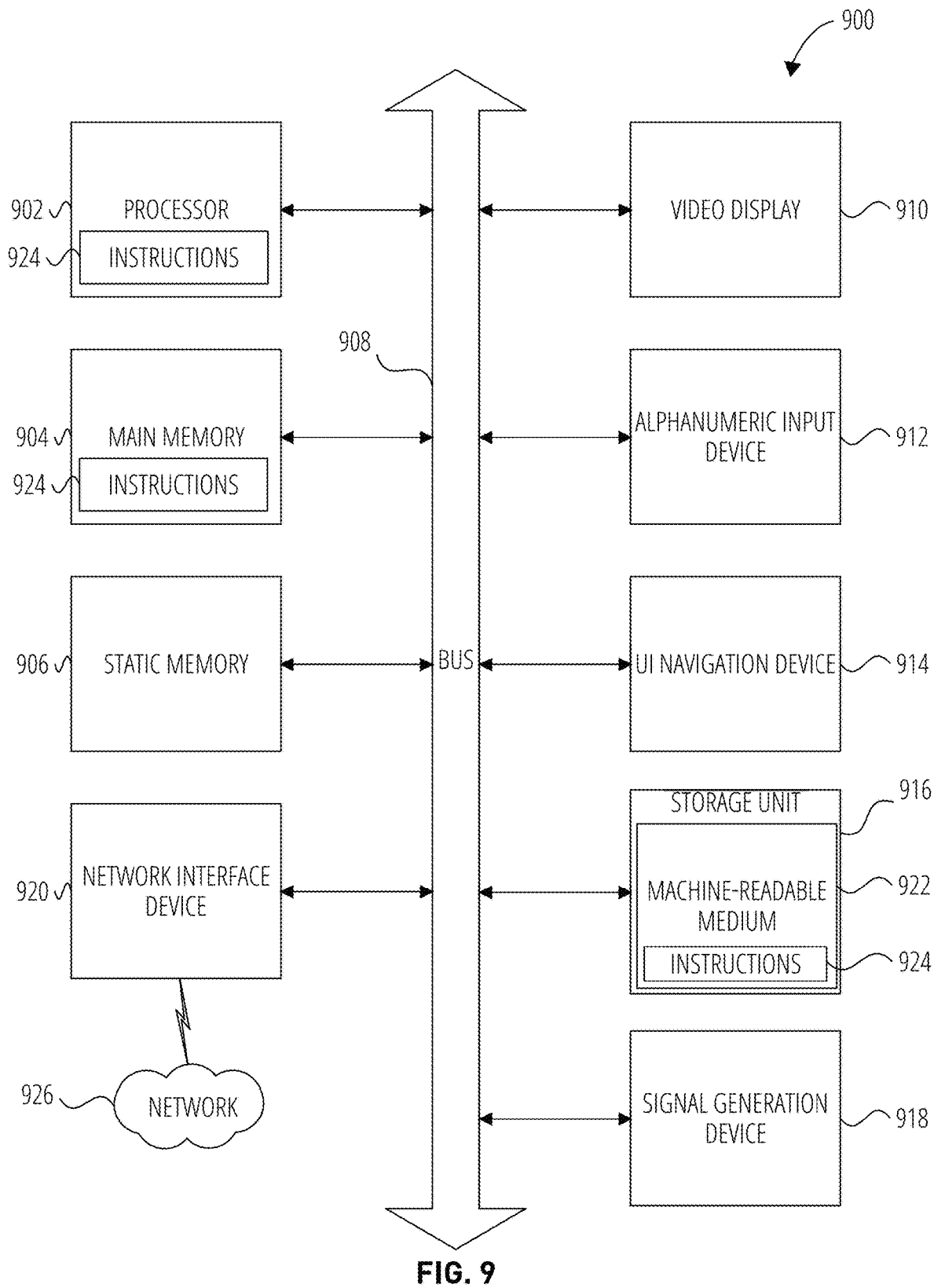
FIG. 9 is a block diagram of a machine in the form of a computer system, according to some examples, within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a GPU, or both), a primary or main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a storage unit 916, a signal generation device 918 (e.g., a speaker), and a network interface device 920.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (which may be referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 or within the processor 902 during execution thereof by the computer system 900, with the main memory 904 and the processor 902 also each constituting a machine-readable medium 922.

While the machine-readable medium 922 is shown in accordance with some examples to be a single medium, the term "machine-readable medium" may include a single medium or multiple media (e.g., a centralized or distributed database, or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of a machine-readable medium 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A computer-implemented method comprising:
   for each data object of a plurality of data objects, storing a reference to the data object in a subset of a plurality of core pools of a software cache, each core pool of the plurality of core pools being uniquely associated with a respective processing core of a plurality of processing cores, and the storing of the reference enabling access to the reference from each of the plurality of core pools based on a pool access range;
   detecting a cache miss on a target reference by a first processing core of the plurality of processing cores that is uniquely associated with a first core pool of the plurality of core pools, the target reference being the reference to a particular one of the plurality of data objects;
   in response to detecting the cache miss, retrieving the target reference from a second core pool of the plurality of core pools that is uniquely associated with a second processing core of the plurality of processing cores, the second core pool being within the pool access range of the first core pool; and
   copying the target reference retrieved from the second core pool to the first core pool.

2. The computer-implemented method of claim 1, wherein the storing of the reference comprises distributing the reference to fewer than all of the plurality of core pools, the distributing of the references being performed for the plurality of data objects based on a predetermined reference distribution scheme that automatically varies the subset of the plurality of core pools in which a given reference is stored while enabling access to the given reference from each of the plurality of core pools based on the pool access range.

3. The computer-implemented method of claim 2, wherein the predetermined reference distribution scheme comprises varying a starting core pool selected from among the plurality of core pools in which the given reference is stored, and selecting one or more other core pools from among the plurality of core pools relative to the starting core pool.

4. The computer-implemented method of claim 1, wherein the pool access range defines, for a given core pool of the plurality of core pools, a number of adjacent core pools relative to the given core pool that can be accessed by a given processing core that is uniquely associated with the given core pool.

5. The computer-implemented method of claim 1, comprising, for each data object of the plurality of data objects:
generating the data object as an immutable data object;
storing the immutable data object in memory; and
generating the reference that is stored in the subset of the plurality of core pools to enable access to the immutable data object via the software cache.

6. The computer-implemented method of claim 1, comprising performing random reference removals on one or more of the plurality of core pools.

7. The computer-implemented method of claim 6, wherein the random reference removals are performed on a current core pool of the plurality of core pools in response to detecting a predetermined operation of a current processing core of the plurality of processing cores.

8. The computer-implemented method of claim 1, comprising:
determining that a particular reference is present in fewer than a threshold portion of the plurality of core pools; and
removing the particular reference from one or more of the plurality of core pools storing the particular reference based on determining that the particular reference is present in fewer than the threshold portion of the plurality of core pools.

9. The computer-implemented method of claim 8, comprising:
in a first stage, targeting the particular reference for removal from a current core pool of the plurality of core pools; and
in a second stage following the first stage, performing random reference removals on the current core pool.

10. The computer-implemented method of claim 8, wherein the removing of the particular reference is performed on a current core pool of the plurality of core pools in response to detecting a predetermined operation of a current processing core of the plurality of processing cores.

11. The computer-implemented method of claim 8, wherein the threshold portion is between 15% and 40% of the plurality of core pools.

12. The computer-implemented method of claim 1, wherein, for each data object of the plurality of data objects, the reference to the data object comprises a reference-counted handle.

13. The computer-implemented method of claim 1, comprising:
detecting that the target reference is no longer stored in any of the plurality of core pools; and
in response to detecting that the target reference is no longer stored in any of the plurality of core pools, removing the data object to which the target reference refers from memory.

14. The computer-implemented method of claim 1, wherein the retrieving of the target reference from the second core pool and the copying of the target reference from the second core pool to the first core pool are performed by the first processing core.

15. A system comprising:
at least one memory that stores instructions; and
one or more processors configured by the instructions to perform operations comprising:
for each data object of a plurality of data objects, storing a reference to the data object in a subset of a plurality of core pools of a software cache, each core pool of the plurality of core pools being uniquely associated with a respective processing core of a plurality of processing cores, and the storing of the reference enabling access to the reference from each of the plurality of core pools based on a pool access range;
detecting a cache miss on a target reference by a first processing core of the plurality of processing cores that is uniquely associated with a first core pool of the plurality of core pools, the target reference being the reference to a particular one of the plurality of data objects;
in response to detecting the cache miss, retrieving the target reference from a second core pool of the plurality of core pools that is uniquely associated with a second processing core of the plurality of processing cores, the second core pool being within the pool access range of the first core pool; and
copying the target reference retrieved from the second core pool to the first core pool.

16. The system of claim 15, wherein the storing of the reference comprises distributing the reference to fewer than all of the plurality of core pools, the distributing of the references being performed for the plurality of data objects based on a predetermined reference distribution scheme that automatically varies the subset of the plurality of core pools in which a given reference is stored while enabling access to the given reference from each of the plurality of core pools based on the pool access range.

17. The system of claim 15, wherein the pool access range defines, for a given core pool of the plurality of core pools, a number of adjacent core pools relative to the given core pool that can be accessed by a given processing core that is uniquely associated with the given core pool.

18. One or more non-transitory computer-readable media storing computer-executable instructions that, when executed by a computer system, cause the computer system to perform operations comprising:
for each data object of a plurality of data objects, storing a reference to the data object in a subset of a plurality of core pools of a software cache, each core pool of the plurality of core pools being uniquely associated with a respective processing core of a plurality of processing cores, and the storing of the reference enabling access to the reference from each of the plurality of core pools based on a pool access range;
detecting a cache miss on a target reference by a first processing core of the plurality of processing cores that is uniquely associated with a first core pool of the plurality of core pools, the target reference being the reference to a particular one of the plurality of data objects;
in response to detecting the cache miss, retrieving the target reference from a second core pool of the plurality of core pools that is uniquely associated with a second processing core of the plurality of processing cores, the second core pool being within the pool access range of the first core pool; and
copying the target reference retrieved from the second core pool to the first core pool.

19. The one or more non-transitory computer-readable media of claim 18, wherein the storing of the reference comprises distributing the reference to fewer than all of the plurality of core pools, the distributing of the references being performed for the plurality of data objects based on a predetermined reference distribution scheme that automatically varies the subset of the plurality of core pools in which a given reference is stored while enabling access to the given reference from each of the plurality of core pools based on the pool access range.

20. The one or more non-transitory computer-readable media of claim 18, wherein the pool access range defines, for a given core pool of the plurality of core pools, a number of adjacent core pools relative to the given core pool that can be accessed by a given processing core that is uniquely associated with the given core pool.

* * * * *